United States Patent Office 3,005,833
Patented Oct. 24, 1961

---

3,005,833
PIGMENT DYESTUFFS OF THE ANTHRA-
QUINONE SERIES
Ernst Gutzwiller, deceased, late of Basel, Switzerland, by Jenny Gutzwiller-Markees, administratrix, Basel, Switzerland, and Wolfgang Schoenauer, Riehen, Switzerland, assignors, by mesne assignments, to Saul & Co., Newark, N.J., as nominee of Fidelity Union Trust Company
No Drawing. Filed May 10, 1954, Ser. No. 428,855
Claims priority, application Switzerland May 13, 1953
4 Claims. (Cl. 260—377)

The present invention relates to pigment dyestuffs of the anthraquinone series.

More particularly, the invention has especial relation to pigment dyestuffs which correspond to the formula

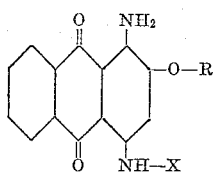

wherein R stands for unsubstituted or substituted alkyl aralkyl or aryl radicals, and X stands for the radical of an aromatic carboxylic acid.

These pigment dyestuffs can be prepared by reacting 1,4-diaminoanthraquinones of the formula

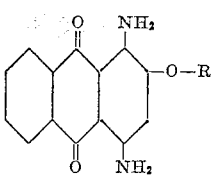

wherein R has the previously-recited significance, in molar proportion with functional derivatives of aromatic carboxylic acids, and then working up the resultant N-monoacyl-1,4-diaminoanthraquinones into pigment dyestuff form.

The aforesaid pigment dyestuffs can also be prepared by acylating both amino groups of the 1,4-diaminoanthraquinones (I) by reaction with functional derivatives of aromatic carboxylic acids, treating the obtained 1,4-diacylaminoanthraquinones with concentrated sulfuric acid, and then working up the resultant N-monoacyl-1,4-diaminoanthraquinones into pigment dyestuff form.

Illustrative of the 1,4-diaminoanthraquinones which are suitable for the preparation of the pigment dyestuffs of the present invention are, inter alia, the 1,4-diamino-2-alkoxyanthraquinones, the alkoxy groups preferably containing from 1 to 8 carbon atoms; and 1,4-diamino-2-benzyloxyanthraquinone and 1,4-diamino-2-phenoxyanthraquinone, the phenyl nucleus of which may be substituted by halogen, alkyl, alkoxy, nitro, etc.

Illustrative of the functional derivatives of aromatic carboxylic acids for the purposes of the present invention are inter alia the benzene carboxylic acid halides, 2-halogen-benzene-1-carboxylic acid halides, 4-halogen-benzene-1-carboxylic acid halides, methoxybenzene carboxylic acid halides, nitrobenzene carboxylic acid halides, diphenyl carboxylic acid halides, naphthalene-1-carboxylic acid halides, naphthalene-2-carboxylic acid halides, pyrene carboxylic acid halides, chrysene carboxylic acid halides, fluoranthene carboxylic acid halides, perylene carboxylic acid halides, anthraquinone carboxylic acid halides, etc. The carboxylic acid halides, e.g. chlorides, can be added to the solutions or suspensions of the 1,4-diaminoanthraquinones as such, or they may be formed in situ in the reaction solutions or suspensions from the corresponding carboxylic acids by reaction with an appropriate halogenating agent, such for example as thionyl chloride.

The monoacylation of the 1,4-diaminoanthraquinones according to the aforesaid first process embodiment is carried out by allowing a functional derivative of the aromatic carboxylic acid to react in molar proportion with the appropriate 1,4-diaminoanthraquinone. In many cases, it is advantageous to compensate for the unavoidable side-reaction involving saponification of small amounts of the acylating agent, by employing the latter in an excess of 5 to 10 mol-percent. The monoacylation is preferably carried out in organic medium and in the presence of pyridine as condensing agent, at a temperature of 50–80° C. The hydrogen halide, which is liberated in the course of the reaction when an aromatic carboxylic acid halide is employed as acylating agent, is advantageously removed from the condensation mass, for example by passing over the latter a gentle current of air or of an inert gas. The produced N-monoacyl-1,4-diaminoanthraquinone generally precipitates when the condensation mass cools; it is filtered off, washed with an alcohol and finally with hot water, and dried. It can be converted, by reprecipitation from concentrated sulfuric acid, into a state of subdivision favorable to further working up into pigment dyestuff form.

According to the second aforesaid process embodiment, the acylation is effected by acylating both amino groups of the 1,4-diaminoanthraquinone. This reaction is also preferably carried out in organic medium, for example in chlorobenzene, dichlorobenzene, nitrobenzene, etc., with the addition of pyridine, and at a temperature of about 80 to 150° C.; here again, when an aromatic carboxylic acid halide is employed, the evolved hydrogen halide can be eliminated by passing over the reaction mass a gentle current of air or of inert gas. The obtained diacylamino compound is dissolved in sulfuric acid of 90 to 100% strength, subjected to the action of the said acid for some time, and the product then precipitated by pouring the sulfuric acid solution into vigorously stirred water. The treatment with the sulfuric acid results in the saponification of one of the two acylamino groups, and the obtained pigment dyestuff is therefore also an N-monoacyl-1,4-diaminoanthraquinone. In addition to the splitting off of one acyl radical, the treatment with sulfuric acid also converts the condensation product into a form which is very favorable for its further working up.

The pigment dyestuffs are advantageously worked up into finished pigment paste form in suitable machines, such as roller mills, grinders, homogenizing machines, etc., if desired with the addition of dispersing agents such for example as condensation products of naphthalene sulfonic acids and formaldehyde, etc. The worked up pigment dyestuffs can also be obtained in powder form by subjecting the pigment pastes to a suitable drying process, for example in an atomization drier, and then if desired further grinding the dry powder in a suitable grinding apparatus.

The pigment dyestuffs according to the present invention are useful for coloring paper and synthetic fibers in the mass, for the printing of textiles, for dyeing synthetic resins and plastic masses, etc., in red to blue-violet shades having excellent fastness properties.

The following examples set forth presently-preferred exemplary embodiments, which are intended to illustrate but not at all to limit the present invention. In these examples, the parts and percentages are by weight, and the temperatures are in degrees centigrade.

EXAMPLE 1

21 parts of 1,4-diamino-2-ethoxyanthraquinone are heated to 90° in 100 parts of dry chlorobenzene. 0.5 part of pyridine is then added to the solution, and then while stirring 25.5 parts of 4-methylbenzene-1-carboxylic acid chloride are added dropwise in the course of about one hour. The condensation mass is stirred at 90–95° until the presence of 1,4-diamino-2-ethoxyanthraquinone can no longer be detected. The condensation mass is then allowed to cool, the precipitated condensation product is filtered off, washed first with chlorobenzene, then with ethylalcohol and finally with water, and then dried.

15 parts of the thus-obtained 1,4-di-(4′-methyl)-benzoylamino-2-ethoxyanthraquinone are dissolved in the four- to eight-fold quantity of sulfuric acid of 95 to 100% strength. The sulfuric acid solution is stirred for one-half to two hours, and is then poured in thin streams into 2000 to 3000 parts of vigorously stirred water to which, if desired, ice may be added; the temperature of the precipitating mixture is not allowed to exceed 30 to 40°. The precipitated pigment dyestuff is filtered off, washed neutral, and if desired treated with dilute aqueous sodium carbonate or sodium hydroxide solution until the benzene carboxylic acid formed by the saponification of one benzoylamino group is completely removed, suction-filtered and again washed neutral. The dried N-mono -(4′- methyl)-benzoyl -1,4- diamino -2- ethoxyanthraquinone corresponds to the formula

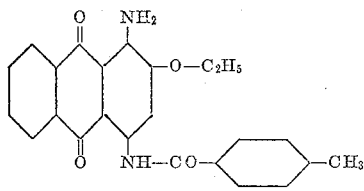

and is a violet-red powder which dissolves with red coloration in sulfuric acid.

To convert the pigment dyestuff into a pigment dyestuff preparation which is ready for practical use, the neutral-washed filter cake is worked together with dinaphthylmethanedisulfonic acid in a suitable apparatus such as a ball mill, roller mill or homogenizer until the desired particle size is realized. The obtained paste can be used as such for textile printing, for coloring paper pulp, or for dyeing viscose in the spinning bath, very vivid red-violet shades of excellent fastness properties being obtained. The paste can also be worked up in a suitable drying apparatus, as for example in an atomization drier, into the form of a pigment powder.

EXAMPLE 2

53 parts of benzene carboxylic acid chloride are added, in the course of one to two hours at 120°–130°, to 43 parts of 1,4-diamino-2-methoxyanthraquinone in 250 parts of dry chlorobenzene. The mass is heated to 125–133° for about five more hours, liberated hydrogen chloride being removed by passing a gentle stream of dry air over the condensation mass. After cooling the latter, the precipitated condensation product is filtered off, washed first with chlorobenzene, then with ethyl alcohol and finally with water, and dried. The obtained 1,4-dibenzoylamino-2-methoxyanthraquinone is an orange-colored crystalline powder which melts at 256–257°.

30 parts of 1,4-dibenzoylamino-2-methoxyanthraquinone are dissolved at room temperature in the four- to eight-fold quantity of sulfuric acid of 95 to 100% strength and then worked up in the manner described in Example 1. The so-obtained N - monobenzoyl - 1,4 - diamino - 2-methoxyanthraquinone corresponds to the formula

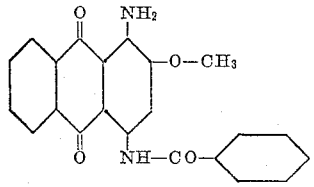

and is a violet-red powder which melts at 285–286°. The pigment dyestuff preparation made therewith dyes viscose in the spinning bath in red-violet shades.

EXAMPLE 3

26.8 parts of 1,4-diamino-2-methoxyanthraquinone in 500 parts of chlorobenzene are dehydrated at 130° by means of a current of air; the resultant solution is then allowed to cool to 50°, while being stirred. 10 parts of dry pyridine are then added, after which 15 parts of benzene carboxylic acid chloride are uniformly added dropwise in the course of 4 to 5 hours at 50–55°. Stirring of the mixture is continued at this temperature for some time, after which the mixture is heated to 80° until the presence of 1,4-diamino-2-methoxyanthraquinone can no longer be detected. The condensation mass is then allowed to cool, and the precipitated N-mono-benzoyl-1,4-diamino-2-methoxyanthraquinone is filtered off, washed with chlorobenzene, ethyl alcohol and water, and dried.

The thus-obtained product is identical with the pigment dyestuff obtained according to Example 2 after the treatment with sulfuric acid. In working the product up to a pigment dyestuff preparation, it is advantageous to re-precipitate it from concentrated sulfuric acid.

EXAMPLE 4

18 parts of 1,4-diamino-2-butoxyanthraquinone are heated to 140° in 120 parts of dry nitrobenzene. Then 26.5 parts of 3-chlorobenzene-1-carboxylic acid chloride are added dropwise to the solution at 140° and in the course of about 30 minutes. Stirring of the mass continues for about two hours at this same temperature, liberated hydrogen chloride being drawn off by means of a stream of air. Thereupon 80 parts of ethyl alcohol are added dropwise to the mass at 100°, and the latter is then allowed to cool while being stirred. The precipitated 1,4-di-(3′-chloro)-benzoylamino-2-butoxyanthraquinone is filtered off, washed with ethyl alcohol and then with water, and is finally dried.

15 parts of the so-obtained condensation product are dissolved in the four- to eight-fold quantity of sulfuric acid of 95 to 100% strength, after which treatment is continued after the manner described in Example 1. In this way, N-mono-(3′-chloro) - benzoyl - 1,4-diamino-2-butoxyanthraquinone, which corresponds to the formula

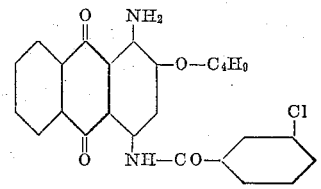

is obtained. It is a pigment dyestuff which dyes in red-violet shades.

EXAMPLE 5

21 parts of 1,4-diamino-2-butoxyanthraquinone in 80 parts of dry 1,2-dichlorobenzene are heated to 110° while stirring. 26 parts of 2-chlorobenzene-1-carboxylic acid chloride are then added dropwise to the resultant solution in the course of one hour, after which the mixture is heated for four more hours at 115–120°, liberated hydrogen chloride being removed from the condensation mass with the aid of a gentle current of air. The condensation mass is then allowed to cool, and 100 parts of ethyl alcohol are added dropwise thereto at 100°. Upon complete cooling of the mass, the formed 1,4-di-(2′-chloro)-benzoyl-2-butoxyanthraquinone is filtered off, washed with ethyl alcohol and with water, and dried.

15 parts of the thus-obtained condensation product are dissolved in the four- to eight-fold quantity of sulfuric acid of 95 to 100% strength and then further treated and worked up after the manner described in Example 1. The so-produced pigment dyestuff, N-mono-(2'-chloro)-benzoyl-1,4-diamino-2-butoxyanthraquinone, corresponds to the formula

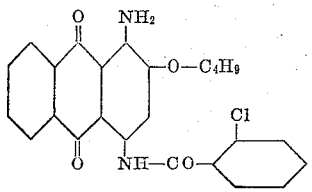

and dyes viscose in the spinning bath in violet-red shades.

EXAMPLE 6

27 parts of pyrene-3-carboxylic acid in 200 parts of 1,2-dichlorobenzene are slowly admixed at 90–100° with 18 parts of thionyl chloride. Upon completion of the conversion into the pyrene-3-carboxylic acid chloride, excess of thionyl chloride is distilled off under slightly reduced pressure, the temperature being raised to 150°. 0.5 part of pyridine is first added to the solution and then, at 110°, 13.4 parts of 1,4-diamino-2-methoxyanthraquinone, the mass being then heated to 110–120° for four hours. Thereupon the reaction mass is allowed to cool, the produced 1,4 - dipyrenoyl - (3') - amino-2-methoxyanthraquinone is filtered off, washed with 1,2-dichlorobenzene, with hot ethyl alcohol and with water, and then dried.

15 parts of the so-obtained condensation product are dissolved in the four- to eight-fold quantity of sulfuric acid of 90% strength, after which treatment is continued after the manner described in Example 1. There is thus obtained N - monopyrenoyl-(3')-1,4-diamino-2-methoxyanthraquinone, which corresponds to the formula

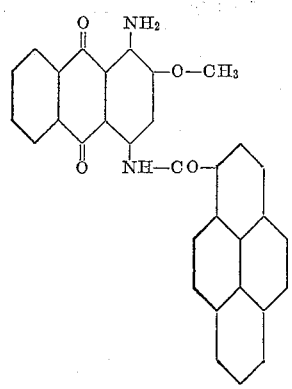

It is a pigment dyestuff which dyes in red-violet shades.

In grinding the sulfuric acid-treated condensation product, in addition to the aforementioned dinaphthylmethane-disulfonic acid, use may be made of any other of a wide variety of dispersing agents, as for example the alkylpolyglycolethers with 20–25 ethoxy groups, such as the cetyl-, stearyl- or oleyl-polyglycolethers, the alkylphenylpolyglycolethers such as dodecylphenylpolyglycolether, the alkylarylsulfonates such as the alkylbenzene sulfonates and the alkylnaphthalenesulfonates, the sulfonated oils, the high molecular weight alkyl sulfates and sulfonates, and many others.

Additional N-monoacyl-1,4-diaminoanthraquinones according to the present invention, and which can be prepared after the manner set forth in the preceding examples, are exemplified in the following table. In the latter, the pigment dyestuffs are characterized by the starting products: 1,4-diaminoanthraquinones of Formula I in column (A) and the functional derivatives of aromatic carboxylic acids in column (B). Column (C) indicates the shade of the respective dyeings obtained with viscose in the spinning bath by means of the obtained pigment dyestuffs.

Table

| Ex. No. | (A) | (B) | (C) |
|---|---|---|---|
| 7 | 1,4-diamino-2-methoxyanthraquinone. | Benzenecarboxylic acid bromide. | Red-violet. |
| 8 | ---do--- | 2-chlorobenzene-1-carboxylic acid chloride. | Reddish violet. |
| 9 | ---do--- | 4-chlorobenzene-1-carboxylic acid chloride. | Red-violet. |
| 10 | ---do--- | 4-bromobenzene-1-carboxylic acid chloride. | Do. |
| 11 | ---do--- | 4-nitrobenzene-1-carboxylic acid chloride. | Bordeaux. |
| 12 | ---do--- | 4-methoxybenzene-1-carboxylic acid chloride. | Red-violet. |
| 13 | ---do--- | 4-phenylbenzene-1-carboxylic acid chloride. | Violet. |
| 14 | ---do--- | Naphthalene-1-carboxylic acid chloride. | Red-violet. |
| 15 | ---do--- | Pyrene-3-carboxylic acid chloride. | Do. |
| 16 | ---do--- | Anthraquinone-2-carboxylic acid chloride. | Violet-red. |
| 17 | 1,4-diamino-2-ethoxyanthraquinone. | Benzenecarboxylic acid chloride. | Violet. |
| 18 | ---do--- | Benzenecarboxylic acid bromide. | Do. |
| 19 | ---do--- | 2-chlorobenzene-1-carboxylic acid chloride. | Red-violet. |
| 20 | 1,4-diamino-2-n-propoxyanthraquinone. | Benzenecarboxylic acid chloride. | Violet. |
| 21 | ---do--- | 4-chlorobenzene-1-carboxylic acid chloride. | Reddish violet. |
| 22 | 1,4-diamino-2-butoxyanthraquinone. | 4-bromobenzene-1-carboxylic acid chloride. | Violet. |
| 23 | ---do--- | 4-bromobenzene-1-carboxylic acid bromide. | Do. |
| 24 | 1,4-diamino-2-benzyloxyanthraquinone. | Benzenecarboxylic acid chloride. | Reddish violet. |
| 25 | 1,4-diamino-2-(2'-phenyl)-ethoxyanthraquinone. | ---do--- | Do. |
| 26 | 1,4-diamino-2-phenoxyanthraquinone. | ---do--- | Red-violet. |
| 27 | 1,4-diamino-2-(4'-methyl)-phenoxyanthraquinone. | ---do--- | Do. |
| 28 | 1,4-diamino-2-(2',4'-dichloro)-phenoxyanthraquinone. | ---do--- | Do. |
| 29 | 1,4-diamino-2-(4'-tert. butyl)-phenoxyanthraquinone. | ---do--- | Do. |
| 30 | 1,4-diamino-2-(4'-tert. iso-octyl)-phenoxyanthraquinone. | ---do--- | Do. |
| 31 | 1,4-diamino-2-naphthyl-(2')-oxyanthraquinone. | ---do--- | Do. |

EXAMPLE 32

A medium deep paper coloration is obtained when 2 parts of a 10% aqueous paste of the pigment dyestuff obtained as in Example 3 is added in a hollander to 100 parts of bleached sulfite cellulose in 2000 parts of water. The dyed paper mass is then—for the purpose of vegetable sizing and simultaneous mixing of the pigment dyestuff of the paper fibers—mixed with 40 parts of a 2.5% rosin soap milk and subsequently with 40 parts of a 5% aluminum sulfate solution.

In this or essentially similar manner, paper can be dyed also with the dyestuffs of the other examples.

EXAMPLE 33

As hereinbefore mentioned, an important application of the described pigment dyestuffs consists in dyeing artificial fibers during the spinning process. The principle of the dyeing during the spinning process of viscose artificial silk consists in that the ripened viscose solution is dyed by stirring in of the dyestuff pigments and that the resulting product is then spun by means of the spinning apparatus.

To 100 parts of a 20% aqueous paste of the dyestuff obtained as in Example 1, there are added 22,500 parts of an aqueous, approximately 9% viscose solution in an apparatus provided with a stirrer. The colored spinning mass is then stirred for 15 minutes, is subsequently aired and subjected to the usual spinning and desulfurizing processes.

The dyestuffs of the other examples can be used in a similar manner to dye spinning masses.

EXAMPLE 34

A composition consisting of 100 parts of a 20% aqueous paste of the pigment dyestuff obtained as in Example 2, 400 parts of gum tragacanth (3%), 400 parts of a 50% aqueous solution of egg albumin and 100 parts of a nonionic wetting agent is printed onto a textile fiber material. The printing is dried and is then steamed at 100–101° for half an hour. The printing composition may contain in place of the above named dyestuff any of the other herein-disclosed pigment dyestuffs and/or in place of the gum tragacanth and the egg albumin other binding agents normally used for fixing pigments on the fiber, for example binding agents based on an artificial resin.

Having thus disclosed the invention what is claimed is:

1. The pigment dyestuff of the anthraquinone series which corresponds to the formula

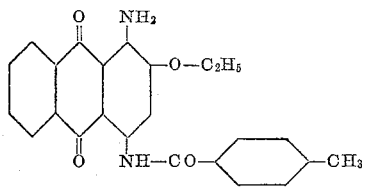

2. The pigment dyestuff of the anthraquinone series which corresponds to the formula

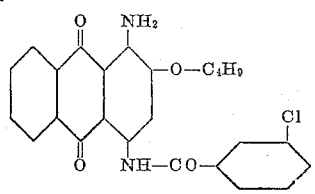

3. The pigment dyestuff of the anthraquinone series which corresponds to the formula

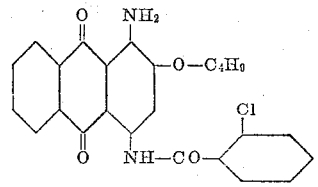

4. The pigment dyestuff of the anthraquinone series which corresponds to the formula

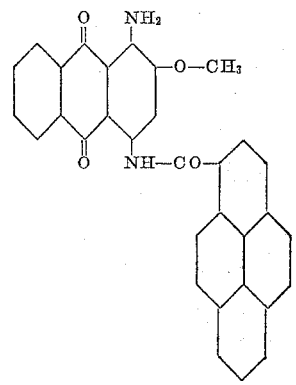

References Cited in the file of this patent

UNITED STATES PATENTS 1,736,088    Nawiasky _____ Nov. 19, 1929

FOREIGN PATENTS 50,530    Netherlands _____ June 16, 1941